United States Patent [19]

Awiszio et al.

[11] Patent Number: 5,193,149
[45] Date of Patent: Mar. 9, 1993

[54] DUAL-PATH COMPUTER INTERCONNECT SYSTEM WITH FOUR-PORTED PACKET MEMORY CONTROL

[75] Inventors: Desireé A. Awiszio, Worchester; Satish Soman, Hudson; Paul H. Clark, Westborough, all of Mass.

[73] Assignee: Digital Equipment Corporation, Maynard, Mass.

[21] Appl. No.: 774,725

[22] Filed: Oct. 8, 1991

Related U.S. Application Data

[63] Continuation of Ser. No. 335,048, Apr. 7, 1989, abandoned.

[51] Int. Cl.[5] .............................................. G06F 13/18
[52] U.S. Cl. .............................. 395/200; 364/DIG. 1; 364/238.4; 364/239.1; 364/244.8; 364/284.1
[58] Field of Search ............ 364/DIG. 1, 239.1, 238.4, 364/244.8, 284.1; 395/200; 370/94.1, 94.3

[56] References Cited

U.S. PATENT DOCUMENTS

| | | | |
|---|---|---|---|
| 4,450,572 | 5/1984 | Stewart et al. | 375/87 |
| 4,490,785 | 12/1984 | Strecker et al. | 364/200 |
| 4,490,788 | 12/1984 | Rasmussen | 364/200 |
| 4,560,985 | 12/1985 | Strecker et al. | 340/825.5 |
| 4,777,595 | 10/1988 | Strecker et al. | 364/200 |
| 4,780,869 | 10/1988 | Eugdahl et al. | 370/16 |
| 4,839,801 | 6/1989 | Nicely et al. | 364/200 |
| 4,972,368 | 11/1990 | O'Brien et al. | 364/900 |
| 4,999,768 | 3/1991 | Hirokawa | 364/200 |

FOREIGN PATENT DOCUMENTS

| | | |
|---|---|---|
| 0276076 | 7/1988 | European Pat. Off. . |
| 8705459 | 9/1987 | World Int. Prop. O. . |
| 8808167 | 10/1988 | World Int. Prop. O. . |

OTHER PUBLICATIONS

Hoyt, "A network architecture", Proceedings of the IEEE, NAECON 1984, vol. 1, May 21, 1984, pp. 135–142.

Primary Examiner—Gareth D. Shaw
Assistant Examiner—Kakali Chaki
Attorney, Agent, or Firm—Arnold, White & Durkee

[57] ABSTRACT

A computer interconnect system uses packet data transmission over serial links connecting nodes of a network. The serial links provide simultaneous dual paths for transmit/receive. An adapter couples a CPU or the like at a node to the serial link. The adapter includes a packet memory for temporarily storing transmit packets and receive packets, along with a port processor for executing the protocol. Packets of data are transferred between the system bus of the CPU and the packet memory of a pair of data movers, one for read and one for write. The packet memory is accessed upon demand by the serial link, the port processor and the data movers, using interleaved cycles. To accommodate this access upon demand without request/grant cycles, parking registers are provided to store read or write data until a later cycle, and the data rate on the packet memory port is high enough to allow ample time for simultaneous use of both channels as well as packet processing and moving to and from the CPU.

51 Claims, 8 Drawing Sheets

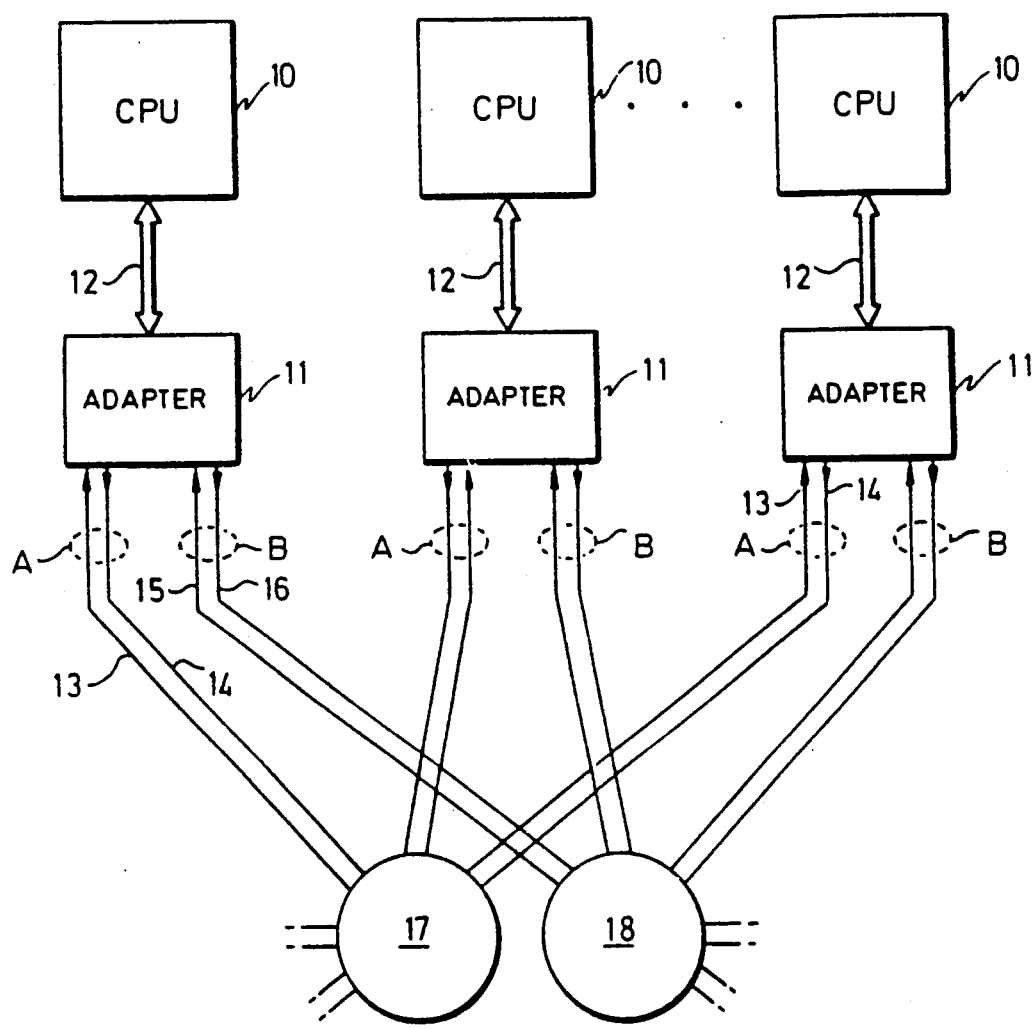
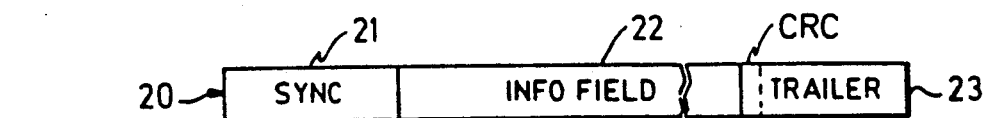
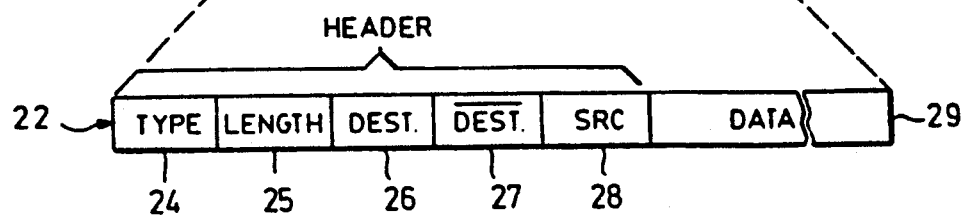

DUAL-PATH COMPUTER INTERCONNECT SYSTEM WITH FOUR-PORTED PACKET MEMORY CONTROL

RELATED CASES

This application is a continuation of an application Ser. No. 07/335,048 filed Apr. 7, 1989, now abandoned, which discloses subject matter also disclosed in copending application Ser. Nos. 335,117 and 335,130 now U.S. Pat. No. 5,020,020, filed Apr. 7, 1989, assigned to Digital Equipment Corporation.

BACKGROUND OF THE INVENTION

This invention relates to computer interconnect systems, and more particularly to a packet communication system employing dual serial data paths between computer nodes.

In U.S. Pat. Nos. 4,777,595, 4,560,985, 4,490,785, and in copending applications Ser. Nos. 109,503 (now U.S. Pat. No. 4,845,722), 110,009 (now U.S. Pat. No. 4,897,833) and 110,513 (now U.S. Pat. No. 4,887,076), filed Oct. 16, 1987, all assigned to Digital Equipment Corporation, assignee of this invention, computer interconnect systems are shown of the type employing packet data transfer using serial paths. These types of computer interconnect systems have been commercially used for processors and bulk memory facilities of the VAX architecture, and provide versatile system of high performance and reliability. However, with increasing demands for additional functions, compatibility with a wide variety of computer equipment, higher speed, lower cost, larger networks and higher reliability (both of data and hardware), further development of this type of interconnect system is imperative.

The likelihood of completing a packet transfer initiated by a given node in a network of this type is dependent upon whether a serial data channel is free, i.e., not being used for another transfer, and whether the destination node itself is free and ready to receive the packet. This likelihood can be increased by having more than one serial data channel interconnecting the nodes. Also, having more than one serial data channel makes possible the simultaneous reception and/or transmitted on more than one channel at the same time, While some prior packet communications systems of the type mentioned above have included two transmission channels for each node, these have been for the purpose of redundancy rather than simultaneous use, and so the net maximum data rates are not improved, even though the reliability is enhanced.

Simultaneous data transmission and/or reception has been provided over serial data links by merely replicating all of the port hardware associated with a serial port or communications adapter. This is only more expensive, occupies more space and consumes more power, but also the ports must be separately addressed by the hosts computer. That is, it is preferable that the multiple simultaneous paths be transparent to the host computer.

When a packet data stream is being transmitted or received by a node in a system of this type, the data handling circuitry used by the node to deliver the data stream to the transmitter, or accept the incoming data stream from the receiver, must be able to execute the transfer without any possibility of a stall or delay due to a bus request not being granted, or the like. Any stall during reception or transmission means the packet must be discarded and resent. Since it is not known when packets are going to be received at a node, a received packet must be quickly moved from the receiver to the host computer since another packet may be following immediately.

It is a principal object of this invention to provide an improved computer interconnect system, particularly one which allows increased performance by simultaneous use of dual paths between nodes. Another object is to provide an improved high-speed computer interconnect system in which a greater probability of gaining use of a transmission path from one node to another is achieved, yet the component parts of the system are not needlessly duplicated. A further object is to provide a dual-path packet data communication system allowing simultaneous transmission and/or reception by these paths, in which use of one or the other of the dual paths is nevertheless transparent to the host computer. An additional object is to provide a packet data transmission and reception system suitable for handling high-performance dual simultaneous operation via two or more serial channels.

SUMMARY OF THE INVENTION

In accordance with one embodiment of the invention, a computer interconnect system employs packet data transfer by dual paths which may be simultaneously active. The nodes or computers are connected by these serial data paths in a star-type network through a central hub. The central hub may be capable of detecting addresses in the packets and establishing a path from a source node to a destination node. A packet buffer is used for temporarily storing packets to be transmitted or packets being received. By using a wide-word (e.g., 32-bit) access port to the packet buffer, with converters for changing to or from bit-serial in accessing this port, the data rate of the high-speed serial paths can be accommodated with interleaved access cycles for this packet buffer. Priority is given to access cycles for the data to or from the serial paths in allocating access to the packet buffer, so there need by no stalls in delivering data at the bit rate of the serial links. The task of moving data to or from the CPU is given secondary priority in the schedule of access to the packet buffer, but even so there is ample time to locally process packets and move them out of the packet buffer to accommodate new incoming data packets. A local processor usually accesses the packet buffer, in addition to the serial paths and the data move function, and the access cycles for this local processor are interleaved with the other necessary accesses, but at lower priority than the serial path access. For example, the local processor may be used to check the header of a packet where addresses, command fields, and other definition information are located; this information is checked while the packet is still in the packet buffer to determine whether or not to move the packet to the host processor. All of these types of access are scheduled without the necessity for the usual request/grant arbitration; the serial paths are given unconditional access when they request it, but cannot access more often than every other cycle, while the local processor is given a fixed-delay access which always allows an intervening cycle if the serial path also needs access. The local processor also cannot make back-to-back accesses to the packet buffer. The task of moving data to or from the host computer uses cycles not occupied by the other two functions. The cycle time of the packet buffer must therefore be fast enough accommodate all of these competing functions. To allow the data movers and the local processor to access the packet buffer in this manner without a request/grant arbitration of the classic type, the data being transferred is conditionally buffered or parked to allow intervening cycles before the transfer is implemented.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

FIG. 1 is an electrical diagram in block form of a dual-path computer interconnect system which may use the features of the invention;

FIG. 2 is a diagram of a packet format which may be used in the computer interconnect system of FIG. 1;

DETAILED DESCRIPTION OF SPECIFIC EMBODIMENT

Figure 3:
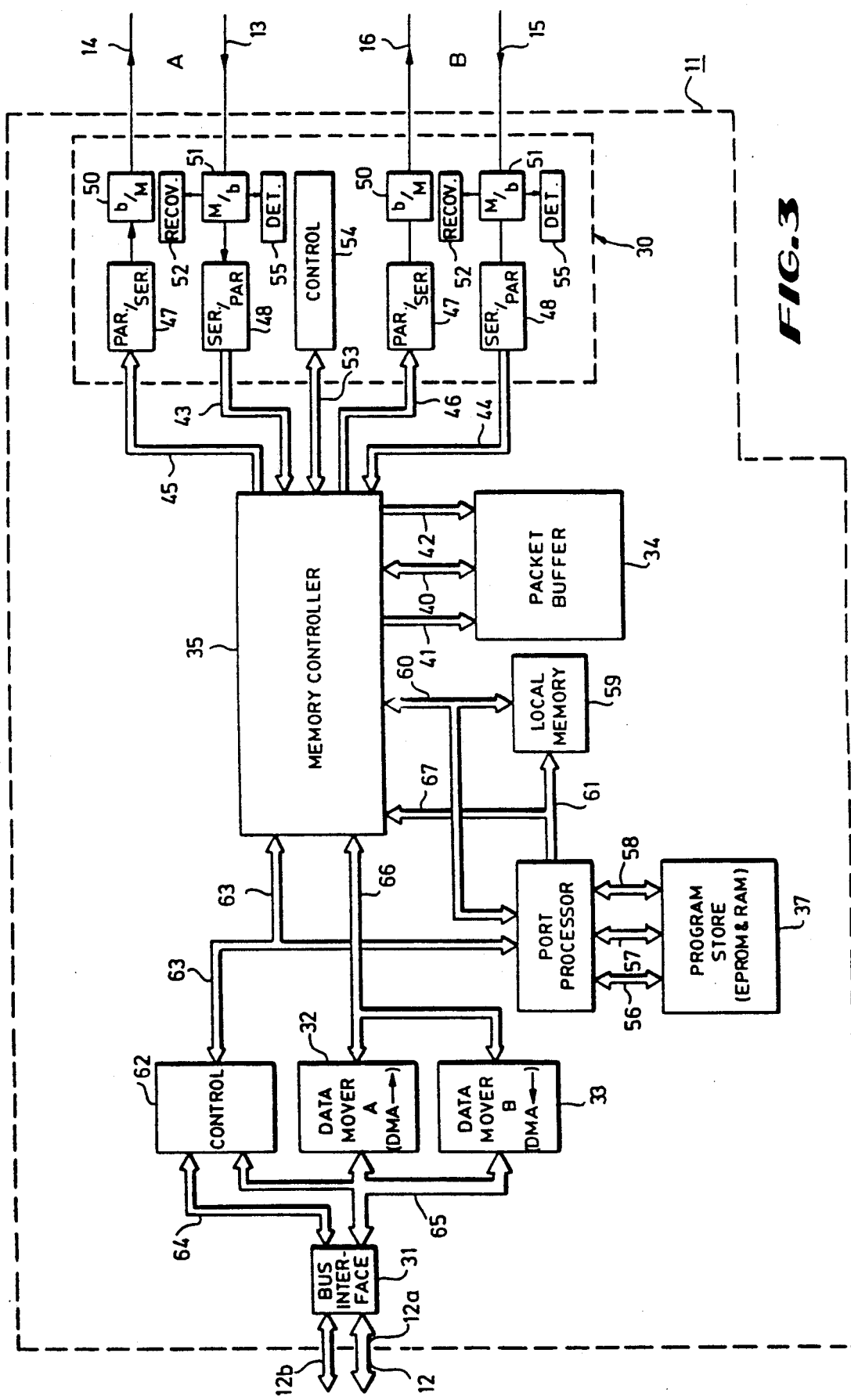
FIG. 3 is an electrical diagram in block form of one of the adapters 11 used in the computer interconnect system of FIG. 1.

Referring to FIG. 1, a packet-type computer interconnect system employing dual paths for simultaneous transmit and/or receive, implementing features of the invention, is illustrated according to one embodiment having a number of CPUs 10 or similar processor-type devices which are capable of generating and receiving messages. The nodes or CPUs 10 could be disk controllers, high speed printer facilities, or other resources of this type, as well as high-performance data processors. Each one of the CPUs 10 is coupled to a communications adapter 11 by a system bus 12. In the case where the CPUs 10 employ the VAX architecture standard, for example, the busses 12 can includes the same 64-bit multiplexed address/data bus and control bus which the VAX CPU uses for accessing main memory and other such local resources. In this computer interconnect system, there can be a large number of these CPUs 10, several hundred or even several thousand, three being shown for simplicity. Each one of the communications adapters 11 is connected to dual communication paths comprising two serial links A and B, where each channel or link A has a serial receive line 13 and a serial transmit line 14, and each link B has a serial receive line 15 and a serial transmit line 16. All of the serial links A are connected to a central hub or distribution node 17, and all of the serial links B are connected to a hub 18. The hubs 17 and 18 can be active interconnect mechanisms, in which case they function as cross-bar switches, making a direct connection between a particular one of the adapters 11 and another one as requested by an address in the message packet transmitted on one of the serial links A or B.

The format of the message packets 20 transmitted and received on the dual path serial links A or B is set forth in FIG. 2 and in U.S. Pat. No. 4,777,595, assigned to Digital Equipment Corporation. The packet 20 includes a sync portion 21, a header and information portion 22, and a trailer 23. The sync portion and trailer are added by the communications adapter 11, while the header and information packet 22 is generated in the host computer or CPU 10 for a node. The header and information portion 22 comprises an integral number of bytes from about ten in length up to, in an example embodiment, about 4,100 bytes. Each byte of the packet 20 is transmitted bit-serially on the links A or B, using Manchester coding. The transmission rate on a serial link A or B is, for example, 70-Mbit/sec, i.e., 114.28-nsec per byte. The sync portion 21 includes a fixed number such as seven one-byte bit-sync characters (e.g., $55_{hex}$) followed by a one-byte character sync (e.g., $96_{hex}$), and functions to allow the receiving adapter 11 to recognize the beginning of an incoming message and to regenerate a clock synched on the bit and character boundaries. The trailer 23 includes first a 32-bit CRC generated by the source node and used by the receiver node to calculate a function of all of the bits in the header and information portion 22 to check the integrity of the received data; the trailer 23 also ends with a number of trailer characters which merely function to designate the end of a message packet. The packets 20 are transmitted asynchronously on the links A and B, separated by intervals where no carrier is present on the wire link.

The header and information portion 22 of the packet 20 of FIG. 2 includes a type or command field 24 specifying what type of message is being transmitted, followed by a length field 25 specifying the length of the message expressed as the number of bytes. An address field 26 specifies the destination address to which the CPU 10 (of the source node) requests the data be sent, and this destination address is repeated in a second field 27 containing the complement of the same address, for reliability purposes. The source address (the address of the node sending the data) is contained in a field 28. These addresses may be absolute addresses, or aliases, depending upon the software used. The size of the address fields determines the number of nodes that can be uniquely addressed in a network; a one-byte address field can address 256 nodes. These fields 24 to 28 constitute the "header" of the packet. Following the addresses in the packet 20 is the data field 29, which may be from zero to 4089 bytes in length. An acknowledge packet is of the same format as the packet 20 of FIG. 2, but it has a zero-length data field 29, and it has no length field 25; the type field 24 of an acknowledge packet has a certain code for a positive acknowledge and another code for a negative acknowledge or NAK.

The medium used to convey the data packets 20 along the serial links A and B as illustrate in FIG. 1 is pairs of coaxial lines 13 and 14, or 15 and 16. That is, four coaxial cables connect to each node (two for each channel). It is understood, however, that other media such as fiber optics or twisted-pair cabling, could be used instead. Likewise, the network may include bridges to other networks, and may use interconnect arrangements other than the crossbar switch mentioned.

In the dual path computer interconnect system of FIG. 1, any one of the CPUs 10 may be simultaneously transmitting packets 20 to two different remote CPUs via the hub 17 or 18, or it may be simultaneously receiving two different packets 20 from two remote CPUs 10, or it may be transmitting a packet 20 on link A and receiving a packet 20 on link B, or vice versa. Thus, when a CPU 10 sends a message packet 20 to the hub 17 or 18 for forwarding to a particular remote CPU 10, the probability of a serial link A or B for the addressed CPU being free to receive is much higher than if only one path was present. If a message packet 20 is sent out by a CPU 10 on a link A or B, and the hub 17 or 18 finds that no path is free to the addressed remote CPU 10, then the packet 20 is discarded and must be resent; when an adapter 11 is transmitting on outgoing line 14 or 16, this adapter is at the same time detecting the carrier on its incoming receive line 13 or 15, and the active hub sends a "flow control" signal on this receive line 13 or 15 when the packet 20 cannot be sent on to the remove CPU addressed by this packet. Thus, the transmission of the packet 20 can be aborted before completion. If a connection is made by the active hub 17 or 18 to the intended remote CPU 10, so that the packet 20 transmitted by a given CPU 10 is sent on to the addressed destination via the active hub 17 or 18, then an acknowledge packet is sent back by this remote CPU and is directed to the given CPU via the receive line 13 or 15.

The circuitry in the active hub 17 may perform the function of detecting the presence of a transmitted packet 20 on any of the lines 14 or 16 by detecting the header 21, determining the destination address from the fields 27 and 27, checking to see if the addressed destination node has a free link A or B, and, if so, making the connection to send the packet to that node. The links A and B are interchangeable from the standpoint of the CPUs 10. The reason for having two serial links A and B instead of one is to increase the probability that one will be free, and so to decrease the average delay time or number of retries needed. At any given time, there can be several completed connections between pairs of nodes through the hub 17 or 18. The hub 17 may be constructed in the manner disclosed in copending U.S. patent application Ser. Nos. 109,503 (now U.S. Pat. No. 4,845,722), 110,009 (now U.S. Pat. No. 4,897,833) and 110,513 (now U.S. Pat. No. 4,887,076), filed Oct. 16, 1987, assigned to Digital Equipment Corporation, incorporated herein by reference, or as explained below in reference to FIGS. 7 and 8.

The adapter 11 is shown in more detail in FIG. 3. A wire interface circuit 30 provides the connection to the transmit and receive wires 13, 14, 15 and 16 of the serial links A and B. At the other end, a bus interface circuit 31 couples the bus 12 to the adapter circuitry; the bus 12 includes a 64-bit multiplexed address/data bus 12a and a control bus 12b. This bus 12 is also used by the CPU 10 to access main memory, for example, and various other resources, so the adapter 11 must share use of this bus. Two DMA-type circuits 32 and 33 called data movers A and B are used to move data between the data bus 12a (via interface 31) and a packet buffer memory 34, using a memory controller 35. The A data mover 32 is used to transfer blocks of data from the CPU 10 to the packet buffer 34, and the B data mover 33 is used to transfer blocks of data in the other direction, from packet buffer 34 to the CPU 10. The data movers 32 and 33 each contain a buffer holding four 64-bit doublewords, so the accesses to bus 12 and packet buffer can be separately timed. A port processor 36 defines the internal operation of the adapter 11 under control of a program stored in a program memory 37 having EPROM and RAM portions. The memory control circuit 35 functions to arbitrate and direct the transfer of outgoing and incoming data packets, storing these temporarily in the packet buffer 34 as will be explained.

The packet buffer 34 is a RAM functioning as a temporary store for packets of data received from either of the A or B receive lines 13 or 15, then such packets are moved from the packet buffer to the CPU 10 or its main memory by data mover B and data bus 12a; similarly the packet buffer 34 functions as a temporary store for packets which are going to be transmitted by either of the A or B transmit lines 14 or 16, in which case the packets are sent from the CPU 10 to the packet buffer via data bus 12a and data mover A. The packet buffer 34 is connected to the memory controller 35 by a 32-bit data bus 40 and a 13-bit address bus 41, along with control lines 42. The size of the packet buffer 34 in the example embodiment is 8K longwords, where a longword is 32-bits, i.e., two 16-bit words or four bytes. Data is transferred from the wire interface circuit 30 to the memory controller 35 (and thus to the packet buffer) by a byte-wide receive data bus 43 for the channel A data receive line 13, or transferred by a byte-wide receive data bus 44 for channel B data receive line 15. Likewise, transmit data is transferred in parallel to the wire interface circuit 30 via transmit data busses 45 or 46 for the channel a or channel B transmit lines 14 or 16, respectively.

The wire interface circuit 30 includes parallel-to-serial converters 47 for outgoing data, and serial-to-parallel converters 48 for incoming data, for each of the A and B channels. Similarly, each outgoing path includes a binary-to-Manchester code converter 50, and each incoming receive-data path includes a Manchester-to-binary code converter 51. A clock is recovered from an incoming signal for each channel A or B using clock detector circuits 52. One example of Manchester-to-binary decoder and clock detector circuitry suitable for use in this wire interface circuit 30 is shown in U.S. Pat. No. 4,592,072, assigned to Digital Equipment Corporation, incorporated herein by reference. The outgoing transmit packets on lines 13 and 15 are clocked by a local 70-Mbit/sec clock oscillator applied to the converters 47 and coders 50. Control of the wire interface circuit 30 is by commands applied from the memory control circuit through a control bus 53 to a controller 54, operating as a state machine. A detector 55 for each channel functions to detect the presence of a carrier on the receive lines 13 or 15, and to provide a carrier-detect signal to the controller 54, and also (after enabled by the controller 54) to detect the presence of the character sync field following the bit sync characters of the packet 20. Thus, an incoming packet first causes the carrier detect signal to be sent to the controller 54, then, if the controller 54 sends an enable signal to the detector 55, the character sync byte causes a sync signal to be sent to the controller 54, at which time the controller 54 would command the serial-to-parallel register 48 to start clocking in the data bits at the clock rate determine by the recovered clock from clock detector 52. After eight clocks (8-bits), a byte of data is loaded to bus 43 or 44 for transfer to the memory controller 35, where four of these bytes are accumulated before writing a 32-bit longword to the packet buffer 34. Since the data rate on the line 13 or 15 is, e.g., 70-Mbit/sec (114.28 nsec/byte), the write operation to the packet buffer 34 need only be at a rate of (32×114.28)/8 or once every 456 nsec; the cycle time for a read or write to packet buffer 34 via busses 40–42 is only about one-eighth this amount (e.g., 64-nsec/cycle), and so there is amble time for accessing the packet buffer for other functions. That is, access cycles on the bus 40 needed to service reception of a packet on one channel is about every seventh or eighth cycle. Outgoing packets are similarly treated; 32-bit longwords are read from the packet buffer via busses 40–42, then sent (byte or nibble at a time) to one of the converters 47 via a bus 45 or 46, then clocked out through binary-to-Manchester coders 50 at a 70-Mbit/sec (14.285 nsec/bit) rate using a local clock instead of a recovered clock. Simultaneous reception (and/or transmission), using both channels A and B, requires only about one-fourth of the available access cycles on the packet buffer bus 40 to transfer data to or from the wire interface 30.

The operation of the memory controller 35, wire interface 30, and data movers 32 and 33, is controlled by the port processor 36, which may comprise a commercially-available high-speed RISC-type microprocessor, or may be especially tailored to the particular protocol or application of the network. This processor 36 accesses its program memory 37 by an address bus 56, a data bus 57 and a control bus 58. Also, a local memory 59 is accessed by an internal data bus 60 which also is used by the processor 36 to write or read various control or status registers in the memory controller 35. The local memory 59 merely functions to store some temporarily-used or variable addresses or node characteristics as may be required; this memory is addressed only by the processor 36 via address bus 61. The processor 36 sends or receives control or command signals to or from the memory controller 35 and a controller 62 for the data movers by a control bus 63. The port processor 36 accesses various address and control registers in the memory controller 35 by the data bus 60 and a 6-bit address bus 67, along with the control bus 63. The controller 62, when activated by commands from the processor 36, memory controller 35 and/or from CPU 10 via control bus 64 (i.e., from system control bus 12b), activates the selected data mover 32 or 33 execute a DMA transfer of four doublewords (a block of four 64-bit segments of data) using the 64-bit data bus 65 on one side or the 32-bit data bus 66 on the other side going to the memory controller 35. Thus, one function of the data mover A is to convert a 64-bit wide data write from the bus 12a to two 32-bit transfers into the packet buffer 34 via bus 66; similarly, data mover B accepts two 32-bit longwords from packet buffer 34 via bus 66 and sends one 64-bit doubleword to bus 12a via bus 65. These transfers are done in groups of four, or 4×64 bits (4×8 or 32-bytes), with a wait period in between; this is to avoid tying up the CPU bus 10 for lengthy periods, and is more than sufficient to keep the packet buffer 34 replenished with transmit data or depleted of receive data so long as a block move is done on average once for every eight 32-bit packet buffer accesses.

Figure 4:
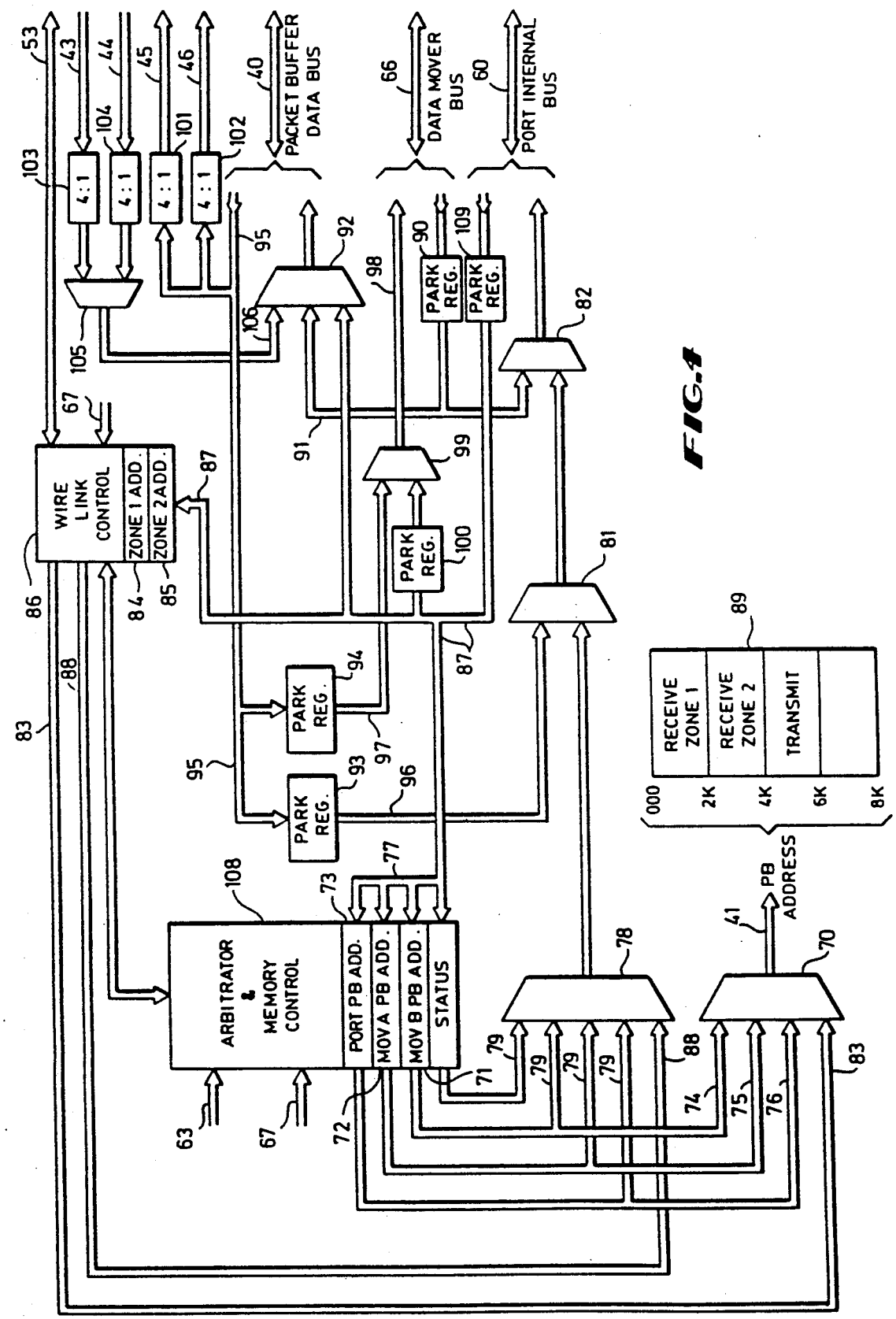
FIG. 4 is an electrical diagram in block form of the memory control circuitry 35 used in the device of FIG. 3.

Referring to FIG. 4, the construction of the memory control circuitry 35 is shown in more detail. This circuitry controls access to the packet buffer data bus 40, the packet buffer address bus 41, the port internal bus 60, and the data mover bus 66, as well as the transmit and receive busses 43, 44, 45 and 46. The packet buffer 34 is ported to four different functional elements, all four of which must have access to the packet buffer. These four functional elements are (1(the wire interface for transmit and receive data, (2) the data mover A for moving in transmit data from the CPU 10, (3) the data mover B for moving out received packets to the CPU 10, and (4) the port processor 36 for checking addresses and otherwise manipulating the transmit and receive data while it is in the packet buffer. Thus the address bus 41 for the packet buffer is driven by a multiplexer 70 having four inputs for these four functions. Address counters 71, 72 and 73 for three of these provide inputs 74, 75 and 76 to the multiplexer 70. The counter 71 holds the packet buffer address used by the data mover B for sending data to the CPU 10, and counter 72 holds the packet buffer address for the data mover A for data being sent to the packet buffer from the CPU 10. The counter 73 holds the address being used by the port processor 36 for accessing the packet buffer for write or read. Each one of these counters is automatically incremented each cycle for repeated reads or writes to adjacent locations for block moves, for example. The address counters 71, 72, and 73 are written to by the port processor 36 via an input bus 77, using the address bus 67 for selection; similarly, these address counters may be read by the port processor via multiplex 78 receiving inputs 79 from the busses 74, 75 and 76 as before (selected by address bus 67), with the output of this multiplexer 78 being coupled via selectors 80 and 81 to the port data bus 60. The other address input for the bus 41 via multiplexer 70 is by an input 83 from a pair of address registers 84 and 85 in a transmit/receive controller 86, and these address registers also may be written to by the processor 36 via port bus 60 and the same internal bus 87 used to write to the address registers 71-73, or read from by the processor 36 via bus 88, multiplexer 78 and selectors 81 and 82, using the address bus 67 for selection.

Also seen in FIG. 4 is a memory map 89 of the packet buffer, where the 8K longwords of storage is shown divided into Zone 1 and Zone 2 for receive data, and a transmit zone for packets of data awaiting transmit. Each one of the Zones 1 and 2 may be 2K longwords in size. The counter register 71 always addresses the transmit zone, and the counter registers 72, 84 and 85 address the Zone 1 and Zone 2 areas of the memory map 89. The zone manager circuitry described below controls the way receive data is written to these zones.

The memory controller circuitry of FIG. 4 defines the pathways between the data mover bus 66 and the packet buffer bus 40. Data in 32-bit longwords from the four by 64-bit buffer in the data mover A is applied to a buffer register 90 where each 32-bit longword may be parked for a cycle before being applied via bus 91 and multiplexer 92 to the data bus 40 to be written to the packet buffer. In a similar manner, data from the packet buffer on the bus 40 may be held in parking registers 93 or 94 which have inputs from bus 95 and have outputs 96 and 97 to the port internal bus 60 or the data mover bus 66. The output 96 from the parking register 93 for packet buffer data is coupled to the bus 60 via selectors 81 and 82. Data going to the data mover B via bus 66 is coupled to a bus 98 by selector 99 which receives one input from the parking register 94 via bus 97 and receives its other input from a parking register 100 functioning to hold a 32-bit longword of data from the bus 87 being sent to data mover B if the bus 66 is busy.

The packet buffer bus 40 of FIG. 4 can supply data to the parking registers 93 and 94 for the port bus or data movers, and supplies data via bus 95 to the transmit busses 45 and 46 going to the wire interface circuitry 30. Since the busses 40 and 95 are 32-bit busses, this data is buffered in couplers 101 and 102 to provide byte or nibble width instead of 32-bit wide data; the buses 40 and 95 have a cycle time four or eight times shorter than the busses 45 and 46 (and about 32-times shorter than the time required to transfer 32-bits of data on wires 14 and 16). The incoming data on busses 43 and 44 is likewise buffered in couplers 103 and 104 to change from byte-wide to 32-bit wide, and then connected by selector 105 and bus 106 to the multiplexer 92. Thus, in a given machine cycle of the processor 36 or bus cycle of the packet buffer 34, the packet buffer can deliver a 32-bit longword of data to (1) a coupler 101 or 102, or (2) the register 93 for delivery this cycle or the next to the processor 36 via bus 60, or (3) the register 94 for delivery in this cycle or the next to the data mover B via bus 66; or, alternately, the packet buffer can receive (for write) a 32-bit longword from (1) the coupler 103 or 104, or (2) the data mover A via bus 66 and input 91, or (3) the processor 36 via bus 60 and bus 87, all via multiplexer 92.

The arbitration and control of which of the sources or destinations of data is used in any given cycle is determined in an arbitration and control circuit 108 in the memory controller circuitry of FIG. 4, functioning to supply the packet memory 34 with addresses via selector 70 and bus 41 and with read or write controls via bus 42, and to establish a data path between the bus 40 and the other elements as just described. To this end, the control 108 applies control signals (not shown) to each of the selectors 70, 78, 81, 82 92, 99, and 105 in machine cycles where these devices are used, and to load or read the various registers or busses. The control 108 also triggers the incrementing of the counter registers 71–73 or 84 and 85 during sequential reads or writes, i.e., block moves.

When a data transfer from the packet buffer 34 and the CPU 10 via data mover B is needed, as when a packet has been received and stored in the packet buffer, the port processor 36 executes a routine which first loads the beginning address of this packet into the register 71 (and thus begins a fetch of the addressed data from the packet buffer to the park register 94), and then control is transferred to the arbitrate and control circuit 108 and mover control 62 by commands issued on bus 63. The control 62 receives a "read mover buffer ready" command which is asserted on a line of bus 63 from control 108, and when the mover B is ready (mover B must request bus access via control bus 64 to gain use of the CPU data bus 12a), it asserts a "read mover transfer GO" command via bus 63 to the memory controller circuitry 108, which then clear the "read mover buffer ready" command and places the 32-bit longword fetched from the packet buffer onto the bus 66 via path 95, 94, 97 99, 98 in FIG. 4. If the bus 66 is busy or the GO signal is not asserted yet, this data can be held in the park register 94. The address register 71 is incremented by the control 108 and the "ready" and "GO" sequence begins again. The mover A assembles eight longwords transferred in this manner and stores them in its internal four by 64-bit buffer, then when this internal buffer is full attempts an eight-longword write to the CPU 10, usually by DMA to the main memory of the CPU, and when it has been given access to the CPU bus and completed the write it can then assert Go again. Since the processor 36 keeps track of start and end addresses of the packets, it has also loaded a count register in the control 108 so that the sequence will end when this count is reached, i.e., the entire received data packet has been transferred.

When a transfer from the CPU 10 to the packet buffer 34 via the write mover A is needed, as when the CPU 10 has a massage to send, the CPU 10 will first write a command longword to an internal register in mover A via bus 65, then the control 62 decodes this command it asserts a request via bus 63, in response to which the port processor 36 begins a data move by loading a PB start address to the register 72 that is suitable for a new packet, then transfers control to the controller 108. The controller 108 asserts a "write mover buffer ready" signal on bus 63 to controller 62 indicating that the data can be sent on bus 66. When the control 62 detects a vacant bus cycle by arbitrating the bus 66 for register transfers and packet buffer transfers, it places the first 32-bit longword of the data onto the bus 66 and asserts a "write mover transfer GO" signal, causing the controller 108 to take data from the bus 66 through park register 90 and write it to the addressed location defined by register 72, via bus 91 and selector 92. If the bus 40 is busy, the data is held in the part register until the next free bus cycle. When the write has been executed, the control 108 asserts the "write mover buffer ready" signal again via bus 63 to control 62, and the cycle repeats.

Figure 5:
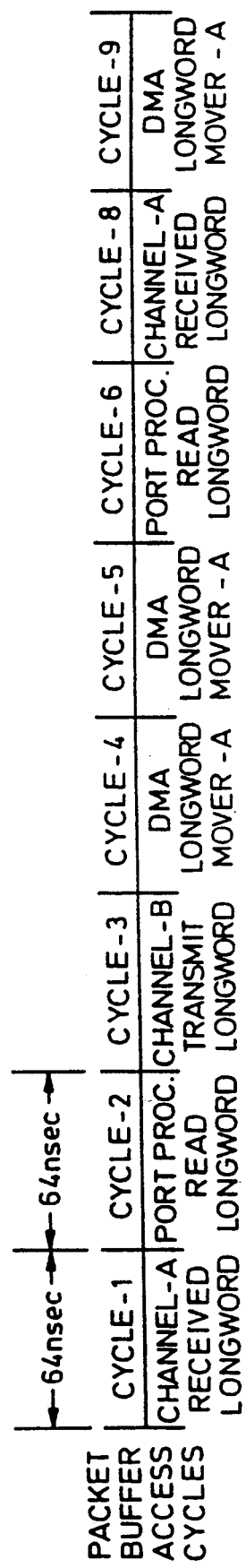
FIG. 5 is a timing diagram of events vs. time for packet buffer access cycles in the system of FIGS. 1-4.

Referring to FIG. 5, a timing diagram of access cycles for the packet buffer bus 40, 41, 42 is illustrated for various conditions. The access cycles are in this example 64-nsec in length, during each of which a write or read may be made to the packet buffer 34. Access to the packet buffer 34 by the port processor 36 and the wire interface 30 is of higher priority than that of the data mover control 62 as just described. That is, if either of the port processor 36 or the wire interface request access to the packet buffer during a cycle-1 of FIG. 5, the data movers are stalled by negating the "ready" signals from control 108 to control 62 mentioned above. The result is that the access time for either the port processor or the wire interface is fixed and predictable. The transmit and receive data rates as indicated above are such that even if both serial paths A and B are in use the amount of data to be transferred via busses 43–46 will occupy only about one-quarter of the access cycles available on the bus 40 and these will be non-adjacent cycles (the wire interface never makes back-to-back requests in two sequential cycles), so if the bus 40 is busy in one cycle for a wire interface transfer it will be free the next. Thus the wire interface can keep up with the serial data stream on the channels A and B, and the code executed by the port processor 36 receives return of memory data in a deterministic fashion; the processor 36 is also restricted to making a bus 40 request at a maximum of every other cycle, i.e., no back-to-back requests are allowed.

The arbitrator and control 108 apportions the memory bus 40 cycles to the processor 36 and the wire interface controllers 86, 54, using the parking registers to avoid the necessity for any request/grant protocol. It appears to the wire interface controls 86, 54 that a request for a write memory access is honored immediately, and the same is true for the port processor 36; the data from either of these sources is accepted by the memory controller 108 which determines if the data is retired (written to memory 34) or parked. The requests are always accepted upon demand, even if both the processor 36 and the controller 86 make a write request in the same cycle. "Read packet buffer" requests are also honored immediately, with the request from the wire interface control 86 being executed in the cycle following the request and the data being returned to the couplers 101 or 102 in the next cycle; the processor 36 has its read request accepted without delay, and, although the memory fetch via bus 40 for this processor read request may occur in either the next or the subsequent cycle, the read data is always returned on the third cycle following the request, as it is held in the park register 93 so the processor 36 can always expect the return data at a fixed delay. In the event the memory controller honors a write request from both the controller 86 and the processor 36 in the same cycle, it parks the data for the processor in the parking register 109 and retires the data from the wire interface couplers 103 and 104 in the first memory cycle then retires the processor data from parking register 109 in the next cycle, leaving the controller 108 ready to accept two more requests. In the event that either the processor 36 or the wire interface controls 86, 54 make a solitary write request, then their data is retired in the first cycle, leaving the subsequent cycle available for the other port if needed.

The parking registers 90 and 94 are used in the data mover interface as mentioned above, in conjunction with the priorities of the wire interface and processor. The "write mover transfer GO" signal sent by the control 62 acts as a packet buffer request and indicates that write data is being sent to the memory controller 35 via bus 66; this data on bus 66 is either written into the packet buffer via path 91 under control of the controller 108 (if no processor or wire interface request is pending), or will be held in the parking register 90, so no data is lost, there is no resend needed, nor is a "bus request, bus grant" arbitration needed after the "ready" signal has indicated that the register 90 is free. The loading of the read mover address register 71 by the port processor 36 is the command to the controller 108 to begin a read mover sequence for accessing the packet buffer. When a cycle for the packet buffer is given to the read mover sequence, the controller 108 prefetches the data from the packet buffer addressed by the register 71 and loads it into the packing register 94. When the mover B is ready to receive this data, the control 62 send the "read mover transfer GO" signal which acts as another request. No "grant" signal in the conventional sense is sent by the memory controller. The data being requested by the mover control 62 with the "read mover transfer GO" signal has already been stored in the parking register 90 before this request from the control 62. The controller 108 causes the data in parking register 90 to be placed onto bus 66 when this "GO" signal is received from control 62, and this signal also acts as another packet buffer request which is arbitrated and another longword of data from the mover B is prefetched if the packet buffer bus is free this cycle. As this "ready"/"GO" handshake progresses, the controller 108 attempts to keep the write mover parking register 90 empty and the read mover parking register 94 full, while using the processor parking register 109 to resolve request conflicts between the processor 36 and the wire interface control 86, 54.

Figure 6:
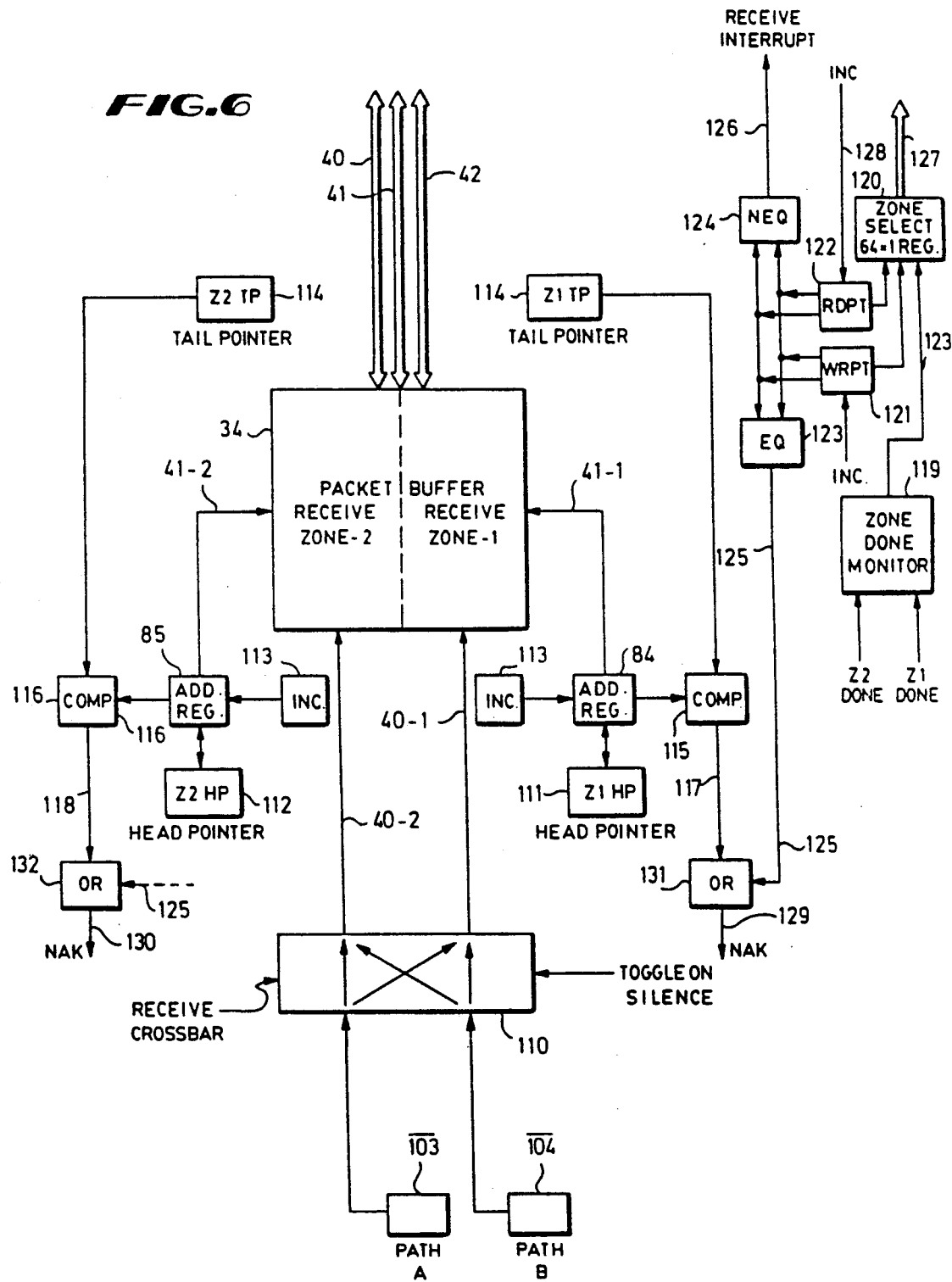
FIG. 6 is an electrical diagram of the logic circuitry of the zone manager in the system of FIGS. 1-4.

As seen in the memory map 89 of FIG. 4, the receive portion of the packet buffer 34 has two zones where receive data is written, and these zones are managed by the controller 108 in a manner which will be represented by the logical depiction of the same circuitry in FIG. 6. The purpose of this one management is to provide temporary storage of the received data in the packet buffer 34 even though two serial data stream packets of variable size may be arriving at the same time. This management technique avoids the prior technique of reserving areas of fixed size, which would reduce the capacity to handle packets even though the buffer was not fully utilized. Because each incoming packet 20, whether large or small, contains the same beginning fields 24-28 and CRC, small packets may have as much or more descriptive information as data field 29. Thus in small packets, the descriptive-to-data ratio may be considered high while in larger packets it is smaller; a small packet utilizes not only space (wasted if fixed areas are allocated) but processor time as well, since the packet must be accessed to examine it and introduce whatever part of the protocol is placed in the responsibility of the port processor. A fixed allocation as mentioned increases the likelihood the packet buffer capacity will be reached to that further incoming data cannot be accepted and must be NAKed and resent later; this double handling wastes computer time.

Accordingly, the purpose of the packet buffer management technique implemented with the logic of FIG. 6 is to accommodate incoming data packets 20 with less likelihood of the buffer 34 being filled and unable to accept more, even though there may be two simultaneous incoming packets, and even though the packets are of variable size. The order of receipt is preserved, regardless of whether channel A or B handled the data, or whether zone 1 or zone 2 stored the data. This must be accomplished at the high data rates of the serial links A and B, i.e., 70-Mbit/sec.

The half of the packet buffer 34 used for receive data (4K longwords) provides up to sixty-four variable-size buffers for packets, available on a demand basis by a zone select arrangement, maintaining sequentiality even though the packets are arriving overlapped. The delivery sequencing is done with respect to successful packet termination times regardless of the packet start times, the packet lengths, or the path A or B on which the packets are received. Multiple, elastic receive-data buffers are thus provided to enhance the ability of the adapter 11 to process packets at high speed.

Referring to FIG. 6, packet memory 34 is considered to have two receive-data zones 1 and 2, and the incoming data from the couplers 103 and 104 is allocated to one or the other zone according to a receiver crossbar 110 which is merely a flip flop in the controller 86 designating which one of the registers 84, 85 is used in association with which coupler 103, 104 input as selected by the selector 105. The crossbar 110 is toggled periodically if the detectors 55 indicate to the controller 86 that both lines 13 and 15 are silent (no carrier). Thus, neither path A or path B is favored for using either zone, and preferably the zones will fill approximately equally. Paths 40-1 and 40-2 are schematically shown for writing to zones 1 and 2 (as if separate and simultaneous), although it is understood that physically the bus 40 is shared and writing is interleaved if two packets are being received simultaneously. Two address registers 111, 112 are included in the controller 86 and function as the head pointers for zone 1 and for zone 2. The registers 84 and 85 used to address the two zones are counters which may be incremented by increment circuits 113. Tail pointers 114 for each zone are included as will be explained. Compare circuits 115 and 116 also included in the control 86 produce outputs 117 or 118 when the content of the address registers 84 or 85 have reached a value equal to the tail pointers 114. The two head pointer registers 111, 112 and two tail pointer registers 114 may be written to (or read) by the port processor 36 using the busses 60, 63 and 67; indeed the logic of FIG. 6 may be performed by code executed by the port processor, although speed is enhanced by using fixed logic in the controller 86.

Data packets may arrive from external sources on line 13 or 15 at any time, and may be on path A or B. Assume packet-1 arrives on path A and is connected by the crossbar 110 to zone 1. When the receive process is started by receipt of a character sync as mentioned above, resulting in a control "sync-A" from controller 54 to controller 86, the zone 1 header pointer is copied from register 111 to register 84 where it is used as the address register pointing to the next empty longword in the packet buffer 34 via multiplexer 70 and bus 41 (depicted as address input 41-1 in FIG. 6). Register 84 is incremented each time a longword is written to the packet buffer 34. If the receive process is terminated successfully (no CRC errors, length equals field 25, etc.) then the contents of register 84 is copied to head pointer register 111 after all longwords of the packet have been written to the packet buffer.

If a second packet 20 comes in from path B while the first packet is in progress, then it is fed to zone 2. The head pointer 112 is copied to counter register 85, which is used to address the longwords of packet buffer zone 2 via address input 41-2 as the register 85 is incremented for each write; upon successful completion the register 85 points to the address next after this stored packet and is copied to the head pointer register 112. If a packet terminates unsuccessfully due to a CRC error, for example, then the head pointer register 111 or 112 is left unmodified and the next packet will write over the bad data just written to the packet buffer. Following receipt of a packet from one path, if the other path is not currently active, then the controller 86 switches the receiver crossbar 110 to swap the connections between path and zone. During silence on both receive lines 13 and 15, the crossbar continuously switches the path-to-zone connection back and forth until a packet reception on either path is detected. Upon detection of an incoming packet, the crossbar is left in whatever position it happened to be in at the time. This is done to distribute packets evenly between the two zones in cases where one of the paths A or B is repeatedly active and the other silent. Upon successful completion of any packet, the controller 86 asserts a zone-done signal Z1-done or Z2-done to a zone-done monitor 119 implemented either in hardware in the control 86 or in software in the port processor and its local memory 59. A 64-bit deep, single-bit-wide register file 120 functions as the zone-select file. A 6-bit 1-of-64 write-pointer register 121 points to one location (one bit) of this file 120, and likewise a 1-of-64 read-pointer register 122 points to one location of this file 120. The zone-done monitor 119 writes via input 123 a zero for zone-1 done or a one for zone-2 done at the address pointed to by the write-pointer 121, every time a Z1-done or a Z2-done signal is received, and increments the write-pointer register 121 so it points to the next free one-bit slot of the file 120. The contents of the write- and read-pointers 121 and 122 are continuously monitored by two compare circuits 123 and 124, where an "equal" output 125 is produced if the pointers 121 and 122 are equal, or a "non-equal" output 126 is produced if the pointers 121 and 122 are not equal. If the non-equal output 126 is produced, then an interrupt is asserted to the port processor 36 indicating that there is at least one packet in the packet buffer 34 that requires service. Upon receipt of this interrupt, the port processor 36 executes a register read operation via bus 60 to retrieve the zone-select output 127 from the zone-select file 120, this output being a one-bit value at the location pointed to by the read-pointer 122, telling the processor 36 whether to fetch data from zone-1 or zone-2 of the packet buffer. This read from output 127 also causes the read-pointer 122 to be incremented by an input 129 such that the next entry in the zone-select file 120 is pointed to. This arrangement causes the packets to be serviced by the port processor 36 in the order received. The routine executed by the port processor 36 when this interrupt can be serviced causes it to access the header of the new packet in the selected zone in the packet buffer to retrieve this data for checking or processing. When this packet has been checked or processed, then forwarded on to the CPU 10 via the data mover B (as this can be done under the priority set by the arbitrator and controller 108), the port processor then adds the packet length (which it retrieved from the field 25 of the packet 20) to the head address (which is maintains in local memory 59 matched with the head pointers 111 and 113). the port processor 36 then writes this new address into the tail pointer 114, releasing the space back to the zone manager logic to be used again as needed. If, during receipt of a packet, the value of the register 84 or 85 being used at the time reaches the value of the corresponding tail pointer register 114, as indicated by output 117 or 118 from compare circuit 115 or 116, then a NAK is sent to the control 86 via lines 129 or 130 and the writing of this packet to the packet buffer zone is stopped and the packet is NAKed (negative acknowledged) so it would have to be resent later. Similarly, if the write-pointer 121 reaches the same value as the read-pointer 122, then all sixty-four slots for packets have been used (the port processor is not keeping up with packet receipt by checking and initiating data mover operations) and so the packet must be NAKed, so the output 125 from equal detector 123 is ORed with the outputs 117 and 118 in gates 131 and 132, so either of these overflow conditions produces a NAK. As packet buffer space is released by the port processor 36 back to the zone manager logic, the tail pointers 114 lead the address counter registers 84 and 85 and so new packets are transferred into the packet buffer 34 and made available for service by the port processor. This zone management technique allows temporary store of variable-length packets with longword granularity in a dual receive path system. The total number of buffers (sixty-four in this example) is set by the size of the zone select file 120 and/or the size of the packet buffer 34 used for the zones. In the 4K longwords allocated in this example, the average packet size is 64 longwords (256 bytes). By using a larger packet buffer 34 and a larger file 120, the capacity could be increased as needed.

Figure 7:
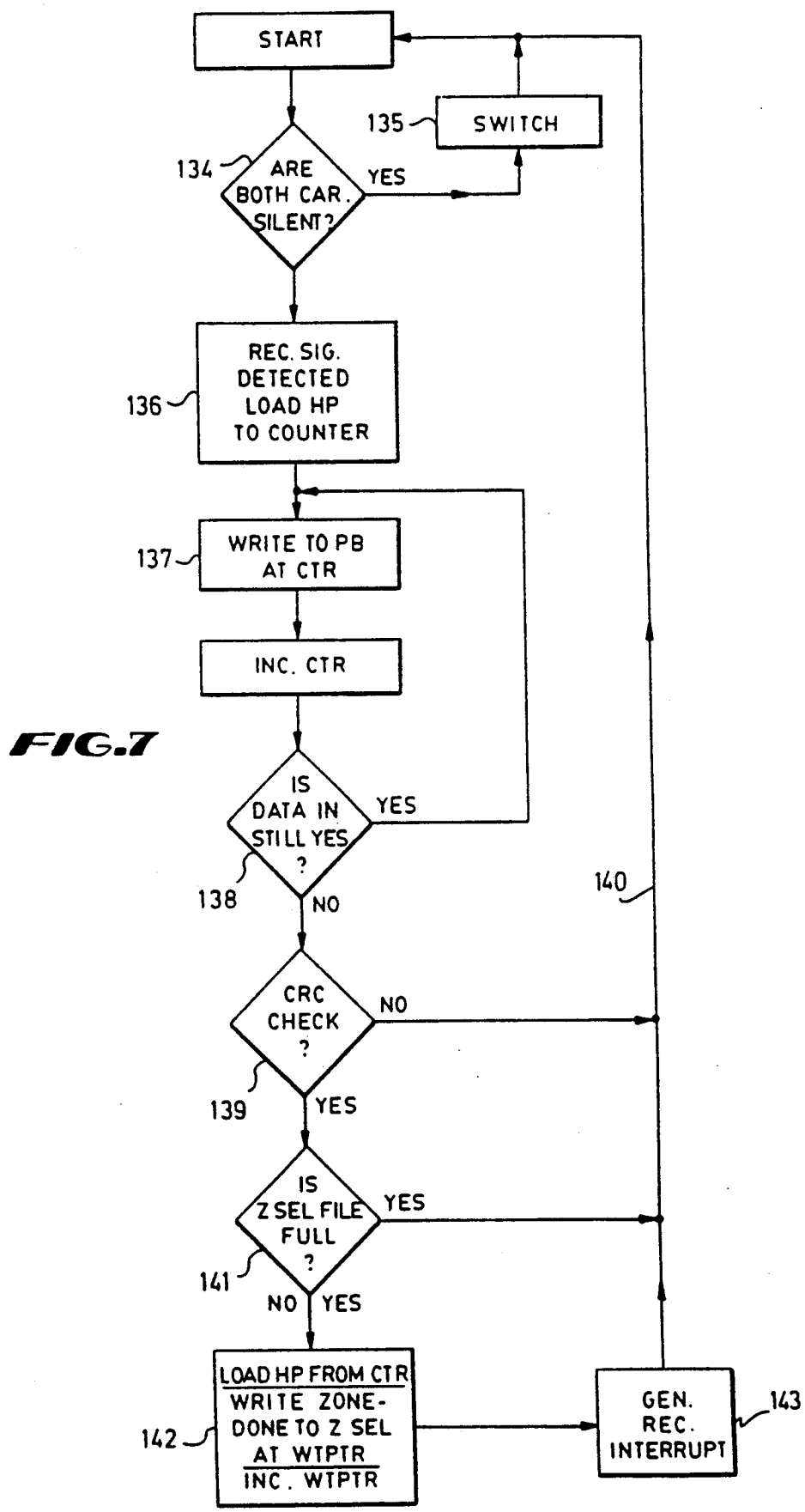
FIG. 7 is a logic flow chart of the states executed by the zone manager of FIG. 6 in the memory controller 35 of FIG. 4.

Referring to FIG. 7, a logic flow chart is shown for operation of the zone management function implemented by the circuitry of FIG. 6. The first step is an idle loop, depicted in blocks 134 and 135, where the crossbar 110 is switched each cycle if neither path A or path B is receiving a packet, i.e., the control 86 checks to see if either of the channels has completed the sequence mentioned above of carrier detect, enable, character sync. If either A or B does, a Sync-A or Sync-B signal is sent by control 54 to control 85. Either one causes the crossbar to be left in whatever condition it is in, and the state of block 136 to be entered, which loads the head pointer 111 or 112 to be loaded to the counter 84 or 85, then a loop is entered to write the contents of 32-bit register 103 or 104 to the packet buffer 34 via bus 40, at state 137, increment the counter register 84 or 85, then check to see if the receive-data signal is still valid at decision point 138; if yes, the loop is reexecuted, if no, the complete packet has been loaded to the packet buffer and the next decision point 139 is whether or not packet is good, so if the CRC check fails then the entire loop begins again via path 140. If CRC check passes, then the comparator 125 is checked at decision point 141 to see if the zone selector file 120 is full, and if so the packet is discarded and the entire loop restarted via path 140. If the file 120 is not full then the steps of block 142 are performed to complete a valid packet load; the counter 84 or 85 is loaded to the head pointer 111 or 112, the zone-done pointer 119 writes to the zone select file 120 to indicate which zone received the packet, and the write pointer 121 is incremented. The last step 143 is to signal an interrupt to the port processor 36, which will be serviced as access cycles are available. After the interrupt is signalled, the entire loop is started again via path 140, whether the interrupt is serviced immediately or not. The zones thus start to fill with packets, and the port processor tries to keep up in servicing the stored packets then initiating mover B operations to send the packets on to the CPU 10. The zones in the packet buffer act as two separate circular buffers, since the head pointers will each roll over to begin at the lowest address after reaching their maximum address values. The zone select file 120 acts as a historical silo of the order of completion of packet receipts, so that the port processor services them and off-loads them in order, even though an set of packets from a single source (constituting a sequence which is expected by the CPU to be in order) might have been routed partly to zone-1 and partly to zone-2 indiscriminately.

Figure 8:
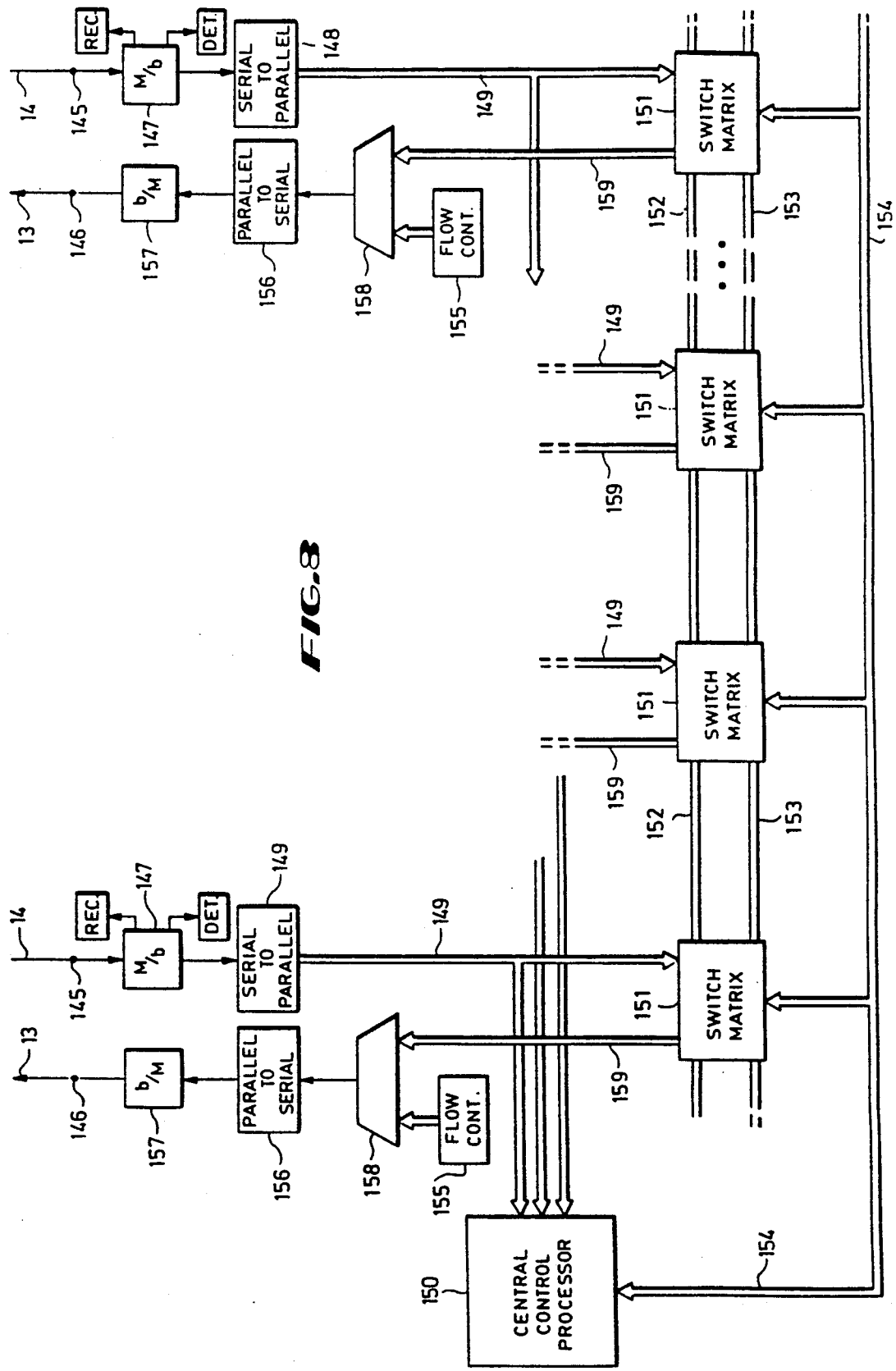
FIG. 8 is an electrical diagram in block form of an active hub used in the system of FIG. 1.

Referring to FIG. 8, the active hub 17 is shown in more detail. The transmit and receive lines from each host CPU or node 10 are connected to corresponding receive and transmit inputs 145 and 146, respectively for the hub. Note that there are two hubs, a hub 17 for all of the A channels and a hub 18 for all of the B channels. Each retrieve input 145 (which is the transmit line 14 or 16 of the node) is connected to a Manchester-to-binary decoder 147, and clock recovery circuit 148 and carrier and sync detect circuits 149 are included just as in the wire interface 30 of FIG. 3, then a serial to parallel converter 148 produces byte-width data on a bus 149. A control processor 150 receives the carrier detect and sync detect signal, then accepts the fields 24–28 of the incoming packet in order to determine what the destination address is, and attempt to route the packet in real time to the destination node. The hub does not store packets for later routing when the destination node might become free, but instead routes the incoming packet immediately or else discards it. The incoming data is coupled by the bus 149 to a switch matrix 151, which is connected by at least two junctors 152 and 153 to all of the other channels of the hub 17. The switch matrixes 151 are controlled by the central controller 150 via bus 154 and function as a crossbar switch to (in effect) connect the input 145 from the source node for the packet to the output 146 of the addressed destination node, and at the same time connect the input 145 of the destination node to the output 145 of the source node so the Acknowledge packet can be sent back as soon as the packet has been received. The controller 150 can detect if the destination node is busy (by checking for carrier) and if so the packet is discarded. A flow control signal is available at a source 155 for sending out through a parallel-to-serial converter 156 and a binary-to-Manchester coder 157 to the transmit output 146 (and thus to the receive line 13). A selector 158 under control of the controller 150 determines whether the output 146 is to be from flow control source 155 or it to be packet data from a bus 159 from the switch matrix. Flow control is sent if the destination channel is busy, or if the junctors 152 and 153 are both busy; with two junctors only two messages can be routed at one time, so more traffic can be handled by having additional junctors. The controller 150 can store the source and destination addresses for a packet that had to be discarded so this source node has a priority for a time after the destination becomes free if the source resends.

Figure 9:
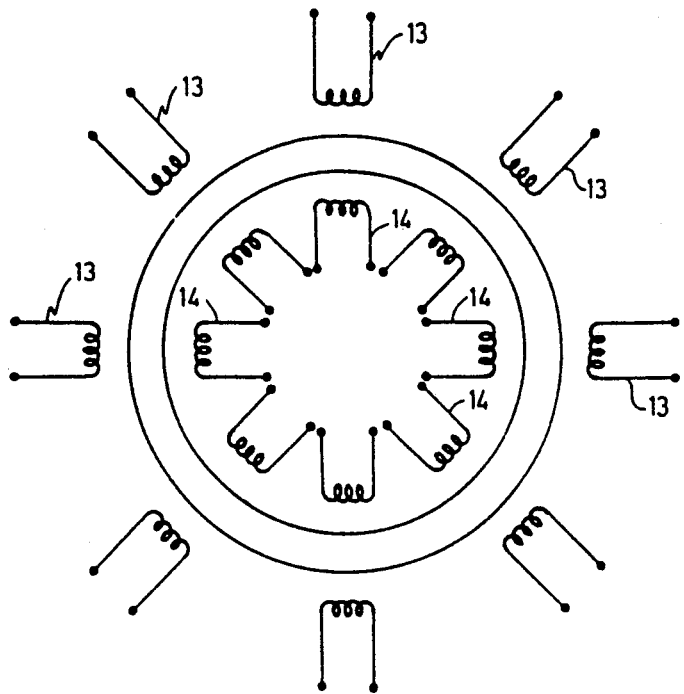
FIG. 9 is an electrical schematic diagram of a passive hub used in the system of FIG. 1, in another embodiment.

A network with a small number of nodes can operate with a passive hub 17 or 18 instead of the active hub of FIG. 8. A passive hub may be merely a star connection as seen in FIG. 9. All of the transmit lines 14 from all of the nodes are connected to primary windings 160 of a transformer, and all of the receive lines 13 going to all of the nodes are connected to secondary windings 161. The nodes operate on the basis of carrier-sense multiple access with collision detect (CSMA/CD), whereby a node with a packet to send first senses its receive line 13 to see if a carrier is present and if so it is known that the hub is busy and so the node waits until the carrier is not present. That is, only one node may be sending and one node receiving at any time. If two nodes simultaneously sense no carrier and start to send, each node will be reading the incoming packet on its input line 13 and noise will be detected instead of its own outgoing packet; in this case both nodes will stop sending the packet, wait a random time (or prioritized time interval according to U.S. Pat. No. 4,560,985) and resend, with the probability being high that one of these nodes will begin before the other so another collision is avoided.

Figure 10:
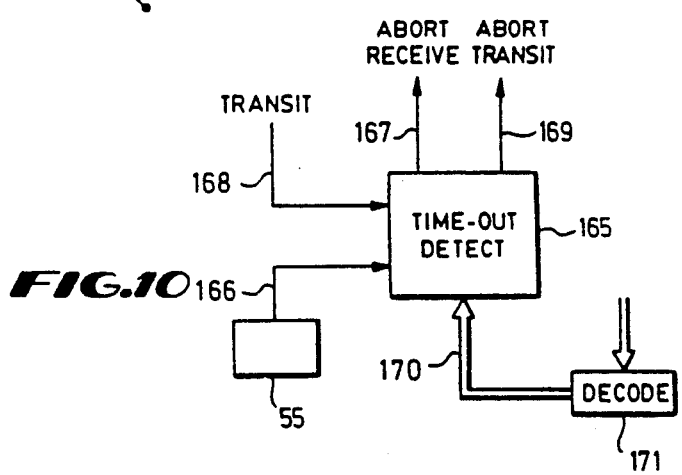
FIG. 10 is an electrical diagram of an abort-transmit circuit used in the system of FIGS. 1-9 according to one embodiment of the invention.

In a system using the active hub of FIG. 8, the probability of the destination node being free and the switch matrix 151 being free to make the connection is acceptable under moderate traffic and a reasonable number of nodes on line. Thus, when a source node 10 sends a packet 20 there is no precheck on availability, but instead if no carrier is detected on the receive line then the packet is transmitted. The source node 10 waits a predetermined timeout period after the end of the trailer of the packet 20 is transmitted, and if an acknowledge packet has not been received then it is assumed that the packet was not received by the destination node 10. Or, if an acknowledge packet 20 is received but it has a NAK type in field 24, then it is known that the packet was received but it could not be buffered. In either of these events, the source node 10 (by code in executed in the port processor 36 defining the protocol) begins a resend, which may occur immediately or may be after a priority backoff of the type disclosed in U.S. Pat. No. 4,560,985. If the switch 151 cannot make the connection to the destination, either because the switches or junctors 152, 153 are busy, or because the destination node has both of its channels A and B busy with other transmission or reception, the controller 150 activates selector 158 to send the flow control signal back to the node on its receive line 13 or 15. The flow control signal is made up of $55_{hex}$ characters, just like the sync characters preceding a packet 20, so it appears as the beginning of packet which will have no character sync or data fields. A header time-out circuit 165 as illustrated in FIG. 10 is therefore included in the interface control 54. This circuit 165 responds differently for reception conditions vs. transmit conditions. When no transmit operation is being attempted, the circuit 165 is response at input 166 from the sync detect circuit 55 to begin a time-out when a carrier is received, then a character sync, a $96_{hex}$, is not received within a selected time-out period; in this case a receive-abort signal is asserted on the line 167 to cause the control to quit clocking data into serial-to-parallel converters 48, so the receive function is aborted. This type of abort would also occur, for example, if the destination address was bad (corrupted or not for this node). The mode of operation when transmitting provides important improvement in performance, according to one embodiment. When a transmit operation is initiated by command to the control 54 an input 168 to the circuit 165 is asserted, and the circuit 165 again responds to the input 166 to begin a time-out when a carrier is detected, then generates an abort-transmit signal on output 169 is a $96_{hex}$ is not received in the selected time-out period. In either receive or transmit modes, the circuit 165 receives inputs 170 from a decoder 171 responding to contents of the serial-to-parallel converter 48 for this channel. The circuitry of FIG. 10 is repeated for both channels A and B.

Figure 11:
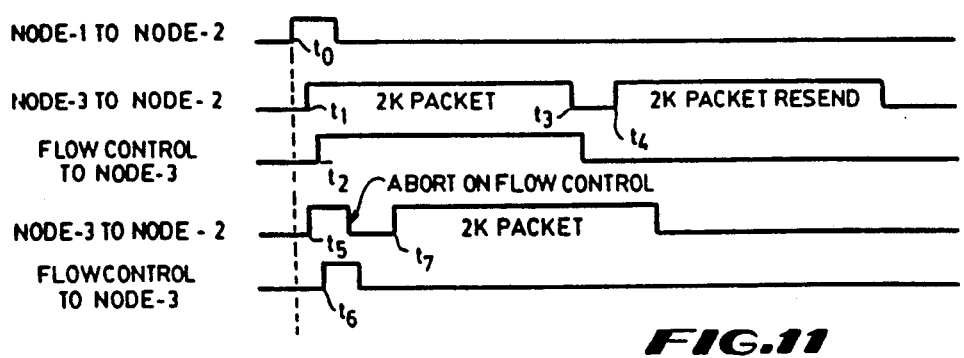
FIG. 11 is a timing diagram showing events vs. time for packet transmission operations in the systems of FIGS. 1-10.

The improved operation provided by the transmit-abort circuit of FIG. 10 is understood in reference to FIG. 11. Assume that a node-1 (one of the CPUs 10 of FIG. 1) begins sending a relatively short packet (e.g., 64-bytes) to node-2 (another of the CPUs 10) at time $t_0$ of FIG. 11, and that node-3 also begins a transmission to node-2 of a 2K-byte packet at time $t_1$. Also assume that node-2 has other traffic on its other channel A or B, or the hub switches are busy, so the node-3 transmission to node-2 cannot go through, and flow control is returned to node-3 by the hub 17 or 18 beginning at time $t_2$ as soon as this busy condition is recognized by the hub. Without the transmit-abort function, the node-3 will continue transmitting it 2K-byte packet until the end of the packet at time $t_3$, even though the entire packet is being discarded at the hub 17 or 18. When no acknowledge packet is received by node-3 by the acknowledge timeout, it resends the packet beginning at time $t_4$. Thus, the time $t_2$ to $t_4$ is wasted with a useless transmission, and also this channel of the node is itself needlessly busy during this period when other traffic might be waiting. Using the abort-transmit function responsive to flow control, however, as also illustrated in FIG. 11, the node-3 transmission beginning at $t_5$ will be aborted at $t_6$ as soon as the flow control signal is recognized, then the 2K-byte packet transmission is retried at time $t_7$, when the probability is it will find a free path to node-2 (e.g., the node-1 to node-2 (64-byte packet has been completed and acknowledged). In this case, the utilization rates of both port-2 and port-3 are higher, so the overall potential throughput or bandwidth is greater. Nevertheless, this performance improvement is compatible with systems using passive hubs, in which case there is no flow control and the abort functions do not occur, and with nodes which do not have this improvement in their circuitry (e.g., older, existing installations) in which case flow control is just ignored as in the illustration of FIG. 11, $t_1$ to $t_4$ situation.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A computer interconnect system having a plurality of nodes, each one of said nodes comprising:
  a) a CPU or the like having a system bus;
  b) a packet buffer;
  c) a data mover means coupling said system bus to said packet buffer by a first path and coupling said packet buffer to said system bus by a second path for transferring packets of data from said system bus to said packet buffer via said first path and including means for simultaneously transferring packets of data from said packet buffer to said system bus via said second path, the data mover accessing said packet buffer on demand;
  d) a serial link for transmitting packets to another of said nodes and receiving packets from another of said nodes;
  e) and packet buffer read/write control means coupled to said serial link and to said data mover; said read/write control means including means for storing packets received by said serial link into said packet buffer and means for accessing packets from the packet buffer for transmitting on said serial link; said read/write control means including means for controlling access to said packet buffer by said means for storing and means for accessing and said data mover, said means for controlling access including means for interleaving said storing packets and accessing packets for said means for storing and means for accessing with said transferring packets of data mover to grant access to said packet buffer for said means for storing and means for accessing during a transfer of a packet to or from said packet buffer by said data mover means.

2. A system according to claim 1 wherein said packet buffer has an input/output port of a data width of at least 32-bit, and said controller couples said serial link to said input/output port by means for converting between 32-bit width and single-bit width.

3. A system according to claim 1 wherein said serial link includes two separate transmit/receive paths.

4. A system according to claim 1 wherein each node includes a local processor coupled to access said packet buffer under control of said read/write control means.

5. A system according to claim 1 wherein said control means includes parking registers for holding data transferred by said data mover to said packet buffer or transferred by said packet buffer to said data mover.

6. A system according to claim 5 wherein said packets are transferred in a plurality of words, one word during each of a plurality of read/write cycles of said packet buffer.

7. A system according to claim 1 wherein said data mover means includes a read data mover and a write data mover providing separate paths for transferring packets from said system bus to said packet buffer and transferring packets from said packet buffer to said system bus.

8. A system according to claim 7 wherein said serial link includes two independent data paths for transmitting or receiving packets.

9. A computer interconnect system having a plurality of nodes, each one of said nodes comprising:
   a) a CPU or the like having a system bus;
   b) a packet buffer;
   c) a data mover for transferring packets of data from said system bus to said packet buffer and transferring packets of data from said packet buffer to said system bus, the data mover accessing said packet buffer on demand;
   d) a serial link for transmitting packets to another of said nodes and receiving packets from another of said nodes, wherein said serial link includes two separate transmit/receive paths, and wherein each one of said separate paths can transmit or receive a packet simultaneously with the other one of said paths also transmitting or receiving a packet;
   e) and packet buffer read/write control means coupled to said serial link and to said data mover; said read/write control means including means for storing packets received by said serial link into said packet buffer and means for accessing packets from the packet buffer for transmitting on said serial link; said read/write control means including means for arbitrating access to said packet buffer for said means for storing and means for accessing and said data mover to interleave said storing packets and accessing packets for said means for storing and means for accessing and said transferring packets of data by said data mover.

10. A computer interconnect system having a plurality of nodes, each node comprising:
    a) a CPU or the like having a system bus;
    b) a packet buffer;
    c) a data mover for transferring packets of data from said system bus to said packet buffer and transferring packets of data from said packet buffer to said system bus;
    d) a serial link for transmitting packets to another node and receiving packets from another node;
    e) and packet buffer read/write control means coupled to said serial link and to said data mover; said read/write control means including means for storing packets received by said serial link into said packet buffer and means for accessing packets from the packet buffer for transmitting on said serial link; said read/write control means including means for arbitrating access to said packet buffer for said means for storing and means for accessing and said data mover upon demand, said access for said data mover being interleaved with said storing packets and accessing packets for said means for storing and means for accessing;
    f) a local processor coupled to access said packet buffer under control of said read/write control means;
    said read/write control means granting access for said means for storing and means for accessing and said local processor to said packet buffer in interleaved cycles by assuring that said access for said means for storing and means for accessing to said packet buffer occur in non-adjacent cycles and that access for said local processor to said packet buffer occurs in non-adjacent cycles.

11. A method for packet data communication between a plurality of nodes connected by serial links, each node having a CPU and a packet memory, comprising the steps of:
    a) sending a transmit-packet from said CPU of a node to said packet memory by writing a sequence of words to said packet memory during a plurality of first access cycles for the packet memory;
    b) transferring said transmit-packet to one of said serial links for transmitting to another one of the nodes by reading a plurality of words from the packet memory of said node during a plurality of second access cycles for said packet memory;
    c) receiving a receive-packet on one of said serial links and assembling said receive-packet into words for writing to said packet memory of said node during a plurality of third access cycles of said packet memory;
    d) accessing said words of said transmit-packet or said receive-packet in said packet memory during a plurality of fourth access cycles of the packet memory;
    e) and sending said receive-packet to said CPU by reading a sequence of words from said packet memory during a plurality of fifth access cycles of the packet memory;
    at least some of said first, second, third, fourth or fifth access cycles being interleaved, and wherein said second access cycles are never consecutive, and wherein said third access cycles are never consecutive.

12. A method according to claim 11 wherein a second access cycle never immediately follows a third access cycle, and a third access cycle never immediately follows a second access cycle.

13. A method according to claim 11 wherein all of said access cycles are executed upon demand, with priority being given to said second and third access cycles, then next priority being given to said fourth access cycles.

14. A method according to claim 13 including the step of temporarily storing said words during sending from said CPU to said packet memory or from said packet memory to said CPU.

15. A method according to claim 11 wherein the period of time of one of said second or third cycles is not more than substantially one-fourth of the period of time of serial transmitting of one of said words.

16. A method according to claim 15 wherein said steps of accessing said words and reading said words include accessing or reading words at least 32-bits wide.

17. A method according to claim 11 wherein said processing means accesses said words in said fourth cycles by requesting a write in a given cycle with the write being executed a number of cycles later determined by whether one of said second or third cycles is being executed.

18. A method according to claim 17 wherein said processing means accesses said words in said fourth cycles by requesting a read in a given cycle with the data from said read being delivered a fixed number of cycles later regardless of whether one of said second or third cycles is being executed.

19. A method according to claim 18 including the step of parking said data from said read for delivering said fixed number of cycles later.

20. A method according to claim 11 wherein said step of transferring includes serializing said words.

21. A method according to claim 11 wherein said transmitting and receiving may occur simultaneously and may be on either of two separate serial links.

22. A computer interconnect system having a plurality of nodes, each node comprising:
    a) a CPU or the like having a system bus;
    b) a packet buffer;
    c) a data mover for transferring packets of data from said system bus to said packet buffer and transferring packets of data from said packet buffer to said system bus;
    d) a serial link for transmitting packets to another node and receiving packets from another node;
    e) and packet buffer read/write control means coupled to said serial link and to said data mover; said read/write control means including means for storing packets received by said serial link into said packet buffer and means for accessing packets from the packet buffer for transmitting on said serial link; said read/write control means including means for arbitrating access to said packet buffer for said means for storing and means for accessing and said data mover upon demand, said access for said data mover being interleaved with said storing packets and accessing packets for said means for storing and means for accessing; wherein said control means includes means for providing a fixed and predictable delay in accessing said packet buffer.

23. A computer interconnect system having a plurality of nodes, each one of said nodes comprising:
    a) a CPU or the like having a system bus;
    b) a packet buffer;
    c) a data mover for transferring packets of data from said system bus to said packet buffer and transferring packets of data from said packet buffer to said system bus, the data mover accessing said packet buffer on demand; wherein said data mover includes a read data mover and a write data mover providing separate paths for transferring packets from said system bus to said packet buffer and transferring packets from said packet buffer to said system bus;
    d) a serial link for transmitting packets to another of said nodes and receiving packets from another of said nodes;
    e) and packet buffer read/write control means coupled to said serial link and to said data mover; said read/write control means including means for storing packets received by said serial link into said packet buffer and means for accessing packets from the packet buffer for transmitting on said serial link; said read/write control means including means for arbitrating access to said packet buffer for said means for storing and means for accessing and said data mover to interleave said storing packets and accessing packets by said means for storing and means for accessing and said transferring packets of data by said data mover; and including a local processor accessing said packet buffer and wherein said control means apportions access time of said packet buffer between said local processor, said data mover and said serial link.

24. A computer interconnect system having a plurality of nodes, each one of said nodes comprising:
    a) a CPU or the like having a system bus;
    b) a packet buffer;
    c) first and second data movers coupling said system bus and said packet buffer by first and second paths, said first data mover transferring packets of data from said system bus to said packet buffer via said first path and said second data mover transferring packets of data from said packet buffer to said system bus via said second path, said first and second data movers being operable to simultaneously transfer said packets to and from said packet buffer in interleaved manner via said first and second paths;
    d) a serial link for transmitting packets to any other of said nodes and receiving packets from any other of said nodes, said serial link including means for accessing said packet buffer;
    e) and packet buffer read/write control means coupled to said means for accessing and to said first and second data movers; said read/write control means arbitrating access to said packet buffer by said means for accessing and said first and second data movers.

25. A system according to claim 24 wherein said serial link includes two independent data paths for transmitting or receiving packets.

26. A system according to claim 24 wherein said control means includes parking registers for holding data transferred by said first and second data movers to said packet buffer or transferred by said packet buffer to said first and second data movers.

27. A computer interconnect system having a plurality of nodes, each one of said nodes comprising:
    a) a CPU or the like having a system bus;
    b) a packet buffer;
    c) first and second data movers coupling said system bus and said packet buffer, said first data mover transferring packets of data from said system bus to said packet buffer and said second data mover transferring packets of data from said packet buffer to said system bus;
    d) a serial link for transmitting packets to any other of said nodes and receiving packets from any other of said nodes;
    e) and packet buffer read/write control means coupled to said serial link and to said first and second data movers; said read/write control means arbitrating access to said packet buffer by said serial link and said first and second data movers; said read/write control means including means for granting access for said serial links and said first and second data movers to said packet buffer in interleaved cycles, and means for preventing said serial link from making sequential accesses to said packet buffer in adjacent cycles.

28. A method for packet data communication between a plurality of nodes connected by serial links, comprising the steps of, in each one of said nodes:
    a) moving transmit data from a CPU of a node to a packet buffer of said node by writing to said packet buffer;
    b) transferring said transmit data to a serial link for transmitting to any other one of the nodes by reading from said packet buffer;

c) receiving receive-data on said serial link from any other one of said nodes and writing said receive-data to said packet buffer of said node;

d) moving said receive-data to said CPU by reading receive-data from said packet buffer; and f) arbitrating access to said packet buffer to interleave said reading from said packet buffer with at least some of said writing to said packet buffer, and whereby one of any of said steps of reading or writing is performed upon demand even though another of any of said step of reading or writing is in progress.

29. A method according to claim 28 wherein said steps of moving said transmit data and moving said receive data can be performed simultaneously by separate data movers.

30. A method according to claim 28 including the step of accessing a part of said receive-data in said packet buffer by a local processor.

31. A method for packet data communication between a plurality of nodes connected by serial links, comprising the steps of, in one of said nodes:

a) moving transmit data from a CPU of a node to a packet buffer of said node by writing to said packet buffer;

b) transferring said transmit data to a serial link for transmitting to another one of the nodes by reading from said packet buffer;

c) receiving receive-data on said serial link and writing said receive-data to said packet buffer of said node;

d) accessing said receive-data in said packet buffer by a local processor;

e) moving said receive-data to said CPU by reading receive-data from said packet buffer; and f) arbitrating access to said packet buffer to interleave any of said steps of reading from said packet buffer with any said steps of writing to said packet buffer; wherein said steps of arbitrating access includes apportioning access cycles of said packet memory between (1) moving said data to and from said CPU, (2) moving data to and from said serial link, and (3) accessing said packet buffer by said local processor.

32. A method according to claim 28 wherein said steps of transmitting and receiving may be on either of two separate serial links.

33. A method according to claim 28 including the step of temporarily storing said data when writing to said packet memory.

34. A method for packet data transmission and reception at a node connected to a serial link, comprising the steps of:

a) moving transmit data from a CPU of said node to a packet buffer of said node by writing to said packet buffer;

b) transferring said transmit data to said serial link for transmitting by reading from said packet buffer;

c) receiving receive-data on said serial link and writing said receive-data to said packet buffer of said node;

d) moving said receive-data to said CPU by reading receive-data from said packet buffer; and f) controlling access to said packet buffer whereby at least some of said steps of reading from said packet buffer and said steps of writing to said packet buffer are interleaved and some of said steps of reading and writing are performed with fixed and predictable delay.

35. A method according to claim 34 wherein said step of moving said transmit data is performed in a first path, and said step of moving said receive-data is performed in a second path separate from said first path.

36. A method according to claim 34 including the step of accessing said packet buffer by said local processor to alter selected parts of said receive-data.

37. A method according to claim 36 wherein said step of controlling access includes apportioning access cycles of said packet memory between (1) moving said data to and from said CPU, (2) moving data to and from said serial link, and (3) accessing said packet buffer by said local processor.

38. A method according to claim 34 wherein said steps of transmitting and receiving include the steps of transmitting on one serial link and receiving on another serial link separate from said one serial link.

39. A method according to claim 34 including the step of temporarily storing said data when writing to said packet memory.

40. A computer interconnect system having a plurality of nodes, with dual transmit/receive serial links interconnecting said nodes, each one of said nodes comprising:

a) a CPU or the like having a system bus;

b) packet buffer means;

c) data mover means coupling said system bus and said packet buffer means, said data mover means transferring packets of data from said system bus to said packet buffer means and transferring packets of data from said packet buffer means to said system bus;

d) a pair of separate transmit/receive paths for transmitting packets to any other of said nodes and receiving packets from any other of said nodes via either of said dual serial links, one or the other of said dual serial links being selected transparent to said CPU, said separate transmit/receive paths being simultaneously operable to transmit or receive packets;

e) and read/write control means coupled to said transmit/receive paths and to said data mover means; said read/write control means controlling access to said packet buffer means by said transmit/receive paths and said data mover means whereby said packet buffer means is accessed in interleaved manner by said data mover means and said transmit/receive paths.

41. A system according to claim 40 wherein said data mover means includes a read data mover and a write data mover providing separate paths for transferring packets from said system bus to said packet buffer means and transferring packets from said packet buffer means to said system bus.

42. A system according to claim 40 wherein each of said dual serial links includes a transmit path and a receive path.

43. A system according to claim 40 wherein said packet buffer means is a single packet buffer.

44. A computer interconnect system having a plurality of nodes, with dual transmit/receive serial links interconnecting said nodes, each one of said nodes comprising:

a) a CPU or the like having a system bus;

b) a single packet buffer;

c) data mover means coupling said system bus and said packet buffer, said data mover means transferring packets of data from said system bus to said packet buffer and transferring packets of data from said packet buffer to said system bus;

d) a pair of separate transmit/receive paths for transmitting packets to any other of said nodes and receiving packets from any other of said nodes via either of said dual serial links, one or the other of said dual serial links being selected transparent to said CPU, said separate transmit/receive paths being simultaneously operable to transmit or receive packets;

e) and read/write control means coupled to said transmit/receive paths and to said data mover means; said read/write control means including means for storing and recalling data in said packet buffer for said data mover means and transmit/receive paths, said read/write control means including means for controlling access to said packet buffer for said transmit/receive paths and said data mover means whereby said packet buffer is accessed in interleaved cycles for said data mover means and said transmit/receive paths.

45. A computer interconnect system having a plurality of nodes, with dual transmit/receive paths interconnecting each one of said nodes with other ones of said nodes, comprising:

a) a first one of said nodes including: a first CPU having a first system bus; first packet buffer means; first data mover means coupling said first system bus and said first packet buffer means, said first data mover means transferring packets of data from said first system bus to said first packet buffer means and transferring packets of data from said first packet buffer means to said first system bus; first and second separate transmit/receive paths for transmitting packets to a second one of said nodes or a third one of said nodes and receiving packets from said second or third one of said nodes via either of said first and second transmit/receive paths, said separate transmit/receiving paths being simultaneously operable to transmit or receive packets; and first read/write control means for said packet buffer means coupled to said first and second transmit/receive paths and to said first data mover means, said first read/write control means controlling access to said first packet buffer means by said first and second transmit/receive paths and said first data mover means;

b) a second one of said nodes including: a second CPU having a second system bus; second packet buffer means; second data mover means coupling said second system bus sand said second packet buffer means, said second data mover means transferring packets of data from said second system bus to said second packet buffer means and transferring packets of data from said second packet buffer means to said second system bus; third and fourth separate transmit/receive paths for separately transmitting packets from said second one of said nodes to a third one of said nodes and receiving packets from said third one of said nodes via either of said third and fourth transmit/receive paths, said separate transmit/receive paths being simultaneously operable to transmit or receive packets; and second read/write control means for said packet buffer means coupled to said third and fourth transmit/receive paths and to said second data mover means, said second read/write control means controlling access to said second packet buffer means by said third and fourth transmit/receive paths and said second data mover means;

c) a third one of said nodes including: a third CPU having a third system bus; third packet buffer means; third data mover means coupling said third system bus and said third packet buffer means, said third data mover means transferring packets of data from said third system bus to said third packet buffer means and transferring packets of data from said third packet buffer means to said third system bus; fifth and sixth separate transmit/receive paths for transmitting packets from said third one of said nodes to one of said first and second nodes and receiving packets from one of said first and second nodes via either of said fifth and sixth transmit/receive paths, said separate transmit/receive paths being simultaneously operable to transmit or receive packets; and third read/write control means for said packet buffer means coupled to said fifth and sixth transmit/receive paths and to said third data mover means, said third read/write control means controlling access to said third packet buffer means by said fifth and sixth transmit/receive paths and said third data mover means.

46. A system according to claim 45 including first and second hubs; each one of said first, third and fifth transmit/receive paths being connected separately from said first, second and third ones of said nodes, respectively, to said first hub; each one of said second, fourth and sixth transmit/receive paths being connected separately from said first, second and third ones of said nodes, respectively, to said second hub.

47. A system according to claim 46 wherein each one of said transmit/receive path includes a transmit line and a receive line separate from said transmit line.

48. A system according to claim 45 wherein said data mover means includes a first data mover for transferring packets of data from said system bus to said packet buffer means and a second data mover for transferring packets of data from said packet buffer means to said system bus.

49. A system according to claim 45 wherein said packet buffer means is a single packet buffer accessed by said data mover means and said transmit/receive paths.

50. A system according to claim 49 wherein said packet buffer is accessed by said data mover means and said transmit/receive paths in an interleaved manner.

51. A system according to claim 45 wherein said each of said transmit/receive paths is a serial path.

* * * * *

UNITED STATES PATENT AND TRADEMARK OFFICE
CERTIFICATE OF CORRECTION

PATENT NO. : 5,193,149
DATED : March 9, 1993
INVENTOR(S) : Awiszio et al.

It is certified that error appears in the above-identified patent and that said Letters Patent is hereby corrected as shown below:

Column 23, line 38, after "any" insert --of--.
Column 25, line 54, change "sand" to --and--.

Signed and Sealed this

Eighteenth Day of January, 1994

Attest:

BRUCE LEHMAN

Attesting Officer

Commissioner of Patents and Trademarks